United States Patent
Amemiya et al.

(10) Patent No.: US 7,199,198 B2
(45) Date of Patent: Apr. 3, 2007

(54) FLUORORUBBER BASE SEALANT COMPOSITION AND FLUORORUBBER BASE SEALANT

(75) Inventors: Takashi Amemiya, Fujisawa (JP); Masashi Kudo, Fujisawa (JP); Chiyota Ogata, Aso-gun (JP); Tatsuo Okamura, Aso-gun (JP); Masaya Otsuka, Aso-gun (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 10/544,296

(22) PCT Filed: Feb. 5, 2004

(86) PCT No.: PCT/JP2004/001215

§ 371 (c)(1),
(2), (4) Date: Aug. 3, 2005

(87) PCT Pub. No.: WO2004/069953

PCT Pub. Date: Aug. 19, 2004

(65) Prior Publication Data

US 2006/0058450 A1 Mar. 16, 2006

(30) Foreign Application Priority Data

Feb. 6, 2003 (JP) .............................. 2003-029938

(51) Int. Cl.
*C08F 16/24* (2006.01)
(52) U.S. Cl. ............... 526/247; 526/249; 526/253; 526/254; 526/255; 525/326.2
(58) Field of Classification Search ............... 526/247, 526/249, 253, 254, 255

See application file for complete search history.

(56) References Cited

U.S. PATENT DOCUMENTS 3,933,732 A * 1/1976 Schmiegel ............... 524/148
4,035,565 A 7/1977 Apotheker et al.

(Continued)

FOREIGN PATENT DOCUMENTS

| EP | 0 834 521 A1 | 4/1998 |
| JP | 53-4115 | 2/1978 |
| JP | 1-57126 B2 | 12/1989 |

(Continued)

*Primary Examiner*—David W. Wu
*Assistant Examiner*—Henry S. Hu
(74) *Attorney, Agent, or Firm*—The Webb Law Firm

(57) ABSTRACT

A fluororubber sealant composition includes 100 parts by weight of a fluororubber, which is a copolymer having a cross-linking site derived from a bromine-containing and/or iodine-containing compound, capable of crosslinking with peroxide and having a component unit composition comprising 20 to 23% by mol of a perfluoromethyl vinylether component unit, 60 to 70% by mol of a vinylidene fluoride component unit, 10 to 20% by mol of a tetrafluoroethylene component unit, 0 to 10% by mol of hexafluoropropylene component unit (based on 100% of the total of the above component units), and a small amount of a bromide and/or iodide unsaturated fluorohydrocarbon component unit as a crosslinking site based on 100% by mol of the total of the above component units; and further comprising, based on 100 parts by weight of the fluororubber, 2 to 50 parts by weight of a bituminous fine powder; 0.5 to 6 parts by weight of an organoperoxide; and 1 to 10 parts by weight of a polyfunctional monomer. A sealant is prepared by vulcanizing the above composition. The composition has not only excellent ordinary physical properties but also excellent heat resistance, freeze resistance and fuel oil resistance so that it is suitably used as sealants for automobile fuel.

11 Claims, 2 Drawing Sheets

U.S. PATENT DOCUMENTS

| | | | |
|---|---|---|---|
| 4,214,060 A * | 7/1980 | Apotheker et al. | 525/387 |
| 4,831,085 A | 5/1989 | Okabe et al. | |
| 4,943,622 A | 7/1990 | Naraki et al. | |
| 5,639,838 A * | 6/1997 | Albano et al. | 526/247 |
| 5,969,066 A | 10/1999 | Enokida et al. | |
| 6,613,846 B2 * | 9/2003 | Hintzer et al. | 525/326.2 |
| 6,864,336 B2 * | 3/2005 | Kaspar et al. | 526/255 |
| 2003/0236370 A1 * | 12/2003 | Grootaert et al. | 526/253 |
| 2004/0037967 A1 * | 2/2004 | Feiring et al. | 427/409 |

FOREIGN PATENT DOCUMENTS

| | | |
|---|---|---|
| JP | 2-19129 B2 | 4/1990 |
| JP | 3-56545 A | 3/1991 |
| JP | 10-139970 A | 5/1998 |
| JP | 2001-192482 A | 7/2001 |

\* cited by examiner

FLUORORUBBER BASE SEALANT COMPOSITION AND FLUORORUBBER BASE SEALANT

TECHNICAL FIELD OF THE INVENTION

The present invention relates to a fluororubber sealant composition suitable for forming fluororubber sealants used for automobile fuel and to a fluororubber sealant suitable for automobile fuel. More particularly, it relates to a fluororubber sealant composition having excellent heat resistance, freeze resistance and fuel oil resistance, and capable of preparing a fluororubber sealant suitable for automobile fuel oil, and to a sealant prepared from the composition.

BACKGROUND OF THE INVENTION

Sealants for automobile fuel have been desired to have fuel oil resistance capable of preventing fuel oil leakage from fuel tanks and the like perfectly. Until now, a fluororubber has been mainly used as a sealant component. In addition to gasoline which is a hydrocarbon fuel generally used, oxygen-containing fuels such as ether, alcohol and the like come to be used from the viewpoints of combustion efficiency etc.

Sealants prepared by increasing the fluorine content can have the fuel oil resistance to the oxygen-containing fuels, but, when the fluorine content is increased, the sealants become inferior in freeze resistance to have a possibility of causing fuel leakage in the cold district in winter. Meanwhile, the fluorine content of the sealants is decreased, the freeze resistance of the sealants is good but the resistance to the oxygen-containing fuel is decreased. It is very difficult for sealants even to satisfy both of the fuel oil resistance and the freeze resistance simultaneously.

On this account, development of sealants having not only excellent heat resistance but also excellent freeze resistance and fuel oil resistance and capable of favorable use as a fluororubber sealant for automobile fuel has been desired.

The present invention is intended to solve the problems associated with the above prior arts, it is an object of the invention to provide a sealant composition suitably used for sealants in positions contacted with automobile fuels such as an injector for automobile fuel and the like by improving the freeze resistance, the fuel resistance and the heat resistance of a fluororubber.

It is another object of the invention to provide a sealant suitably usable as a fluororubber sealant for automobile fuel by improving the freeze resistance, the fuel resistance and the heat resistance of a fluororubber.

SUMMARY OF THE INVENTION

The fluororubber sealant composition of the present invention comprises:

100 parts by weight of a fluororubber, which is a copolymer having a cross-linking site derived from a bromine-containing and/or iodine-containing compound, capable of crosslinking with peroxide and having a component unit composition comprising;

(a) 20 to 23% by mol of a perfluoromethyl vinylether component unit, (b) 60 to 70% by mol of a vinylidene fluoride component unit, (c) 10 to 20% by mol of a tetrafluoroethylene component unit, (d) 0 to 10% by mol of hexafluoropropylene component unit (based on 100% by mol of the total of the component units (a) to (d)), and (e) a small amount of a bromide and/or iodide unsaturated fluorohydrocarbon component unit as a crosslinking site based on 100% by mol of the total of the component units (a) to (d); and, based on 100 parts by weight of the fluororubber, 2 to 50 parts by weight of a bituminous fine powder;

0.5 to 6 parts by weight of an organoperoxide; and 1 to 10 parts by weight of a polyfunctional monomer.

The fluororubber sealant composition according to the invention is preferably used in forming sealants for any one object of oils such as fuel oil, lubricating oil and hydraulic oil; aromatic hydrocarbons; aliphatic hydrocarbons; and alcohols, and particularly preferably used in forming fluororubber sealants for automobile fuel.

The fluororubber sealant of the present invention is obtainable by crosslinking the above fluororubber sealant composition.

The fluororubber sealant of the present invention is preferably used for any one object of oils such as fuel oil, lubricating oil and hydraulic oil; aromatic hydrocarbons; aliphatic hydrocarbons; and alcohols, and particularly preferably used as a fluororubber sealant for automobile fuel.

The fluororubber sealant according to the present invention preferably has a TR 10 value, determined by a TR test as defined in JIS K 6261, of not higher than −26° C., and a swelling index with methanol at 25° C. for 168 hr as defined in JIS K 6258 of not more than +30%.

When the above composition of the invention is crosslinked (vulcanized), the freeze resistance, the fuel resistance and the heat resistance of the fluororubber are improved. Using the fluororubber composition, fluororubber sealants having excellent fuel oil resistance and freeze resistance and capable of suitably using as a sealant can be prepared. That is, the resulting fluororubber sealants have excellent fuel resistance such that even if the sealants are used in a portion in contact with automobile fuel oil, alcohol mixed oil, etc, such as injectors for automobile fuel and the like, or in a portion in which these fuel oils are present in a vapor state, etc, the sealants are not swelled nor released in the interface thereof by the fuel and the like, and thereby have no occurrences of fuel oil permeation, fuel oil leakage, deterioration of the sealants, corrosion, change in equality, decay and deformation, and further even if they have the occurrences of these damages, these damages are insignificant. The resulting fluororubber sealants also have excellent freeze resistance such that even if the sealants are put at a very low temperature, i.e. in the cold district in winter, they have no occurrences of sealant hardening, crack (low temperature brittle fracture) and the like.

The fluororubber sealants have excellent balance in heat resistance, freeze resistance and fuel oil resistance so that they are suitably used for the above purposes, particularly suitably used for fluororubber sealants for automobile fuel.

DETAILED DESCRIPTION OF THE INVENTION

Figure 1:
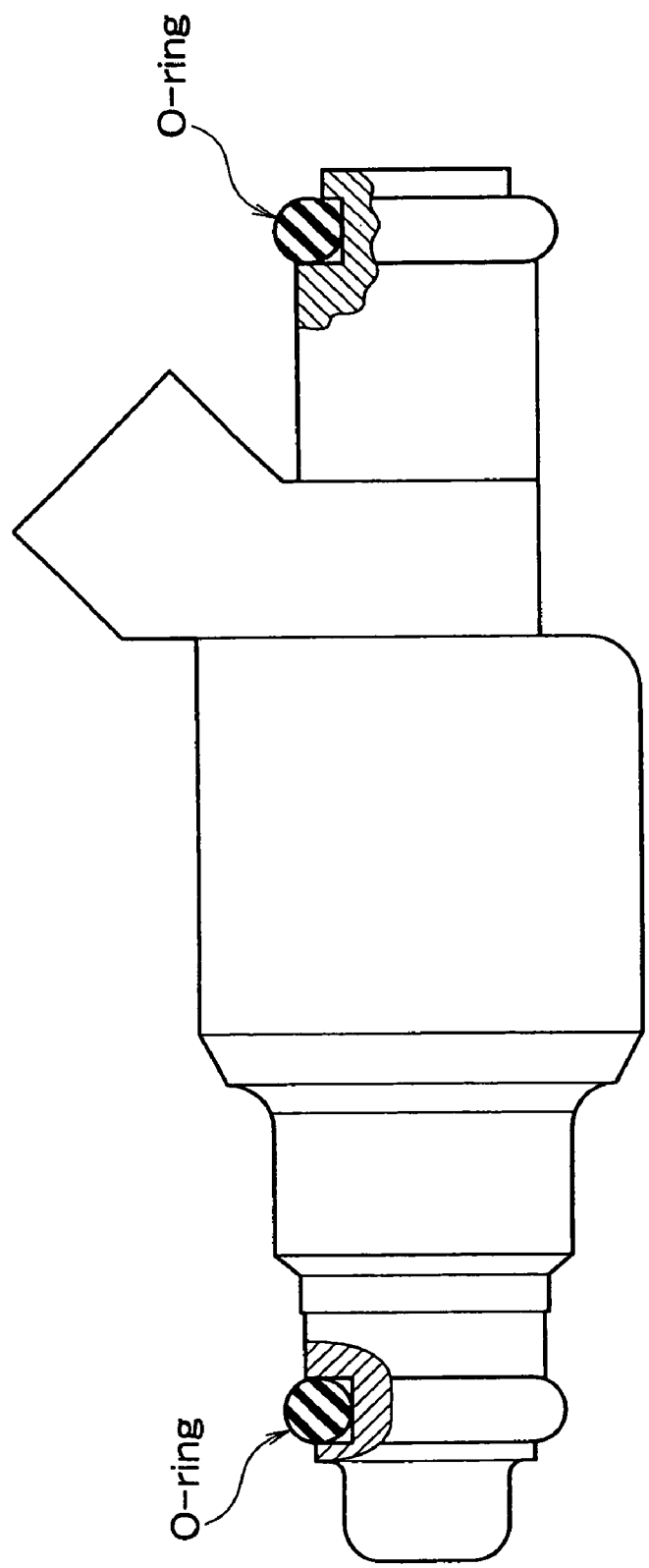
FIG. 1 is an illustrative diagram showing an embodiment that a fluororubber sealant for automobile fuel according to the present invention is used as an O-ring for an injector.

The fluororubber sealant composition and the fluororubber sealant according to the present invention are described hereinafter.

[Fluororubber Sealant Composition]

The fluororubber sealant composition of the present invention (sometimes referred as a sealant composition or composition) comprises a fluororubber capable of crosslinking with a peroxide, a bituminous fine powder, an organoperoxide and a polyfunctional monomer as described in detail below.

<Fluororubber Capable of Crosslinking with Peroxide>

The fluororubber capable of crosslinking with a peroxide used in the present invention has a crosslinking site derived from a bromine-containing and/or iodine-containing compound. Such a fluororubber (fluorine containing copolymer) comprises:

a component unit (a) derived from perfluoromethyl vinylether (PMVE) (provided that hereinafter sometimes abbreviated to perfluoromethyl vinylether (PMVE) component unit or component unit (a), and the other components are also abbreviated similarly hereinafter) in an amount of from 20 to 23% by mol, preferably 20.5 to 22.5% by mol, a vinylidene fluoride (VdF) component unit (b) in an amount of from 60 to 70% by mol, preferably 60 to 65% by mol, and a tetrafluoroethylene (TFE) component unit (c) in an amount of from 10 to 20% by mol, preferably 12 to 18% by mol, and further a hexafluoropropylene (HFP) component unit (d) optionally used in an amount of from 0 to 10% bymol, preferably 0.5 to 8% by mol based on 100% by mol of the total of the copolymerization component units (a), (b), (c) and (d), and a bromide and/or iodide unsaturated fluorohydrocarbon component unit (e) as a crosslinking site in a small amount, for example, from 0.01 to 3% by mol based on 100% by mol of the total of the copolymerization component units (a), (b), (c) and (d).

Monomers for forming the bromide and/or iodide unsaturated fluorohydrocarbon component unit may include 1-bromo-2-iodine perfluoroethane, 1-bromo-3-iodine perfluoroethane and the like.

The fluororubber capable of crosslinking with peroxide (fluorine-containing copolymer) is prepared in accordance with an ordinary method.

For example, the fluororubber capable of crosslinking with peroxide is prepared in accordance with the following methods:

(1) A method disclosed in JP-B-Show 53(1978)-4115, specifically from p. 3 column 6 line 34 to p. 4 column 8 line 23, filed by USA E.I. du Pont de Nemours and Company, (2) A method disclosed in JP-B-Hei 1(1989)-57126, specifically from p. 6 column 11 line 17 to column 12 line 33, filed by Nippon Mektron Ltd., or (3) A method disclosed in JP-B-Hei 2(1990)-19129, specifically from p. 3 column 6 line 38 to p. 4 column 7 line 44, filed by Nippon Mektron Ltd.

In this fluorine-containing copolymer, it is considered that each of the monomers used has a structure that a double bond is cleaved at its carbon-carbon double bond site to make a single bond monomer unit (referred to as a polymerization unit or component unit) and thereby adjacent monomer units are bonded (linked) each other. The resulting fluorine-containing copolymer has a structure such that fluorine containing component units derived from the fluorine containing monomer used are arranged randomly or regularly. The composition proportion of the component units in the fluorine containing copolymer is determined with infrared absorption spectrum, $^{19}$F-NMR or the like by an ordinary method.

The fluororubber capable of crosslinking with peroxide (sometimes referred to as an unvulcanized rubber or uncrosslinked fluorine containing copolymer) desirably has a Moony viscosity (in accordance with JIS K 6300, $ML_{1+10}$, 121° C.) of from 10 to 120, preferably 20 to 80 from the viewpoint of rubber processing, although the viscosity thereof is not particularly limited.

<Bituminous Fine Powder>

As the bituminous fine powder, a fibrous coal having an average particle diameter of from 1 to 10 µm, preferably 3 to 8 µm, prepared by pulverizing coal, can be used in an amount of usually from 2 to 50 parts by weight, preferably 5 to 30 parts by weight based on 100 parts by weight of the fluororubber capable of crosslinking with peroxide (FKM).

When the amount of the bituminous fine powder is less than 2 parts by weight, the effect of the addition of the bituminous fine powder is not observed, namely, the heat resistance of a resulting sealant is not improved or the life of the sealant cannot be prolonged.

As the organoperoxide, organoperoxides usually usable for rubbers can be employed without particular limitation. The organoperoxide is used in an amount of usually from 0.5 to 6 parts by weight, preferably 1 to 5 parts by weight based on 100 parts by weight of the fluororubber capable of crosslinking with a peroxide (FKM).

When the amount of the organoperoxide is less than 0.5 part by weight, a sufficient crosslinking density cannot be obtained, on the other hand, when it is over 6 parts by weight, a crosslinked product cannot be obtained due to foaming and further even if a cross-linked product is prepared, the rubber elasticity and elongation thereof tend to be lowered.

Examples of the organoperoxide may include dicumyl peroxide, tertiary butyl cumyl peroxide, 1,1-di(tertiary butylperoxy)3,3,5-trimethyl cyclohexene, 2,5-dimethyl-2,5-di(tertiary butylperoxy)hexane, 2,5-dimethyl-2,5-di(tertiary butylperoxy)hexyne-3,1,3-di(tertiary butyl peroxy isopropyl) benzene, 2,5-dimethyl-2,5-di(benzoyl peroxy)hexane, tertiary butylperoxy benzoate, tertiary butyl peroxy isopropyl carbonate and n-butyl-4,4-di(tertiary butyl peroxy) valerate.

<Polyfunctional Monomer>

As the polyfunctional monomer, ones usually usable for rubbers can be used without particular limitation. The polyfunctional monomer is used in an amount of usually from 1 to 10 parts by weight, preferably 2 to 8 parts by weight based on 100 parts by weight of the fluororubber capable of crosslinking with peroxide (FKM).

When the amount of the polyfunctional monomer is less than 1 part by weight based on 100 parts by weight of the fluororubber capable of crosslinking with a peroxide (FKM), a sufficient crosslinking density cannot obtained, and when it is over 10 parts by weight, a crosslinked product is not obtained due to foaming, and even if a crosslinked product is obtained, the elasticity and elongation thereof tend to be lowered.

Examples of the polyfunctional monomer may include triallyl isocyanurate, triallyl cyanurate, triallyl trimellitate, trimethylol propane trimethacrylate and N,N'-m-phenylene bis-maleimide.

<Other Compounding Component>

In addition to the above essential components, the rubber composition may include rubber ingredients generally used in rubber industry, for example, a reinforcing agent such as carbon black and white carbon;

a filler such as talc, clay, graphite and calcium silicate;

a processing aid such as stearic acid, palmitic acid and paraffin wax;

an acid receiving agent such as zinc oxide and magnesium oxide;

a antioxidant; and a plasticizer.

These ingredients are appropriately added according to necessity.

In order to prepare the crosslinking fluorine containing copolymer composition having such a compounding ingredient (fluororubber sealant composition), the above components are blended, and then optionally mixed and kneaded in temperature and pressure conditions such that the composition is not vulcanized (cross-linked), for example, at ordinary temperature at ordinary pressure. In the mixing and kneading, it is possible to use a kneading machine such as intermix, kneader or Banbury mixer, or an open roll.

<Crosslinking (Vulcanization)>

For preparing the fluororubber sealant (sometimes referred to as a sealant simply), which is a crosslinked (vulcanized) molded article, suitably used for the purpose typified by fluororubber sealants for automobile fuel, it is possible to appropriately employ usual rubber molding methods such as compression molding, transfer molding, injection molding, extrusion molding, calendar molding and the like. For example, the above fluororubber sealant composition (blend) is usually heated at a temperature of from 150 to 200° C. for about 3 to 60 min using an injection molding machine, compression molding machine, vulcanization press and the like (primary vulcanization) Furthermore, it may be heated at a temperature of about from 150 to 250° C. for about 1 to 24 hr using a heating oven (secondary vulcanization). Further, the above vulcanization may be carried out under pressure if necessary, or the above composition may be put in a predetermined mold and subjected to vulcanization.

In the crosslinking reaction, it is considered that bromine or iodine is released from the crosslinking fluorine containing copolymer by an organoperoxide and a polyfunctional monomer is reacted and linked to the bromine or iodine released portion to form a crosslinking structure.

<Purpose of Sealant>

The sealant thus prepared is a vulcanization molded article and has excellent fuel oil and freeze resistances and good balance between them, also excellent heat resistance and the like. Suitable examples of the purpose may include squeeze packings used in the portions which are contacted with fuels or a gas thereof in a fuel injector (fuel blasting apparatus), fuel pump, fuel tank, fuel piping (example: O-ring, X-ring, D-ring, square ring), and further packings, diaphragm, lining, roll, oil seal and like. Particularly, the sealant is favorably used for the purpose of sealing concerning automobiles.

In FIG. 1, the embodiment of using the fluororubber sealant of the present invention as an O-ring of a fuel injector (fuel blasting apparatus) is shown.

The objects for sealing are not limited to fuel oils for automobile and further my include oils such as lubricating oil or hydraulic oil, aromatic hydrocarbons, aliphatic hydrocarbons and alcohols.

The fluororubber sealant according to the present invention has a TR 10 value of not higher than −26° C., preferably not higher than −27° C., which value is a criterion of evaluating the low temperature resistance and determined by a TR test defined in JIS K 6261 (method of testing vulcanized rubbers at a low temperature). The fluororubber sealant has a swelling amount of usually not more than +30%, preferably not more than +25%, which amount is a criterion of evaluating the fuel oil resistance and is defined by immersing it in methanol at 25° C. for 168 hr in accordance with JIS K 6258 (method of testing resistance to immersion with fuel oil concerning vulcanized rubbers). The fluororubber sealant in an O-ring having a P-24 size has a permanent compression set at 200° C. for 500 hr of usually not more than 80%, preferably not more than 75%, which permanent compression set is a criterion of evaluating the heat resistance and determined in accordance with JIS K6262 (method of testing permanent compression set of vulcanized rubbers).

The fluororubber sealant of the present invention, particularly fluororubber sealant for automobile fuel is obtainable by vulcanizing (cross-linking) the above fluororubber sealant composition, preferably the fluororubber sealant composition for automobile fuel and has not only excellent ordinary physical properties (hardness, tensile strength and elongation) but also excellent heat resistance, freeze resistance and fuel oil resistance so that it is suitably used as sealants for automobile fuels.

EXAMPLE

The fluororubber sealant composition of the present invention, particularly, the fluororubber sealant composition for automobile fuel and the fluororubber sealant, particularly the fluororubber sealant for automobile fuel will be described in more detail with reference to the following examples. The present invention is not limited in any way with the examples.

In the examples and the comparative examples, the test methods, the compositions of the blending components and the physical properties are as follows.

<Method of Testing>

Low Temperature Sealing Test

Figure 2:
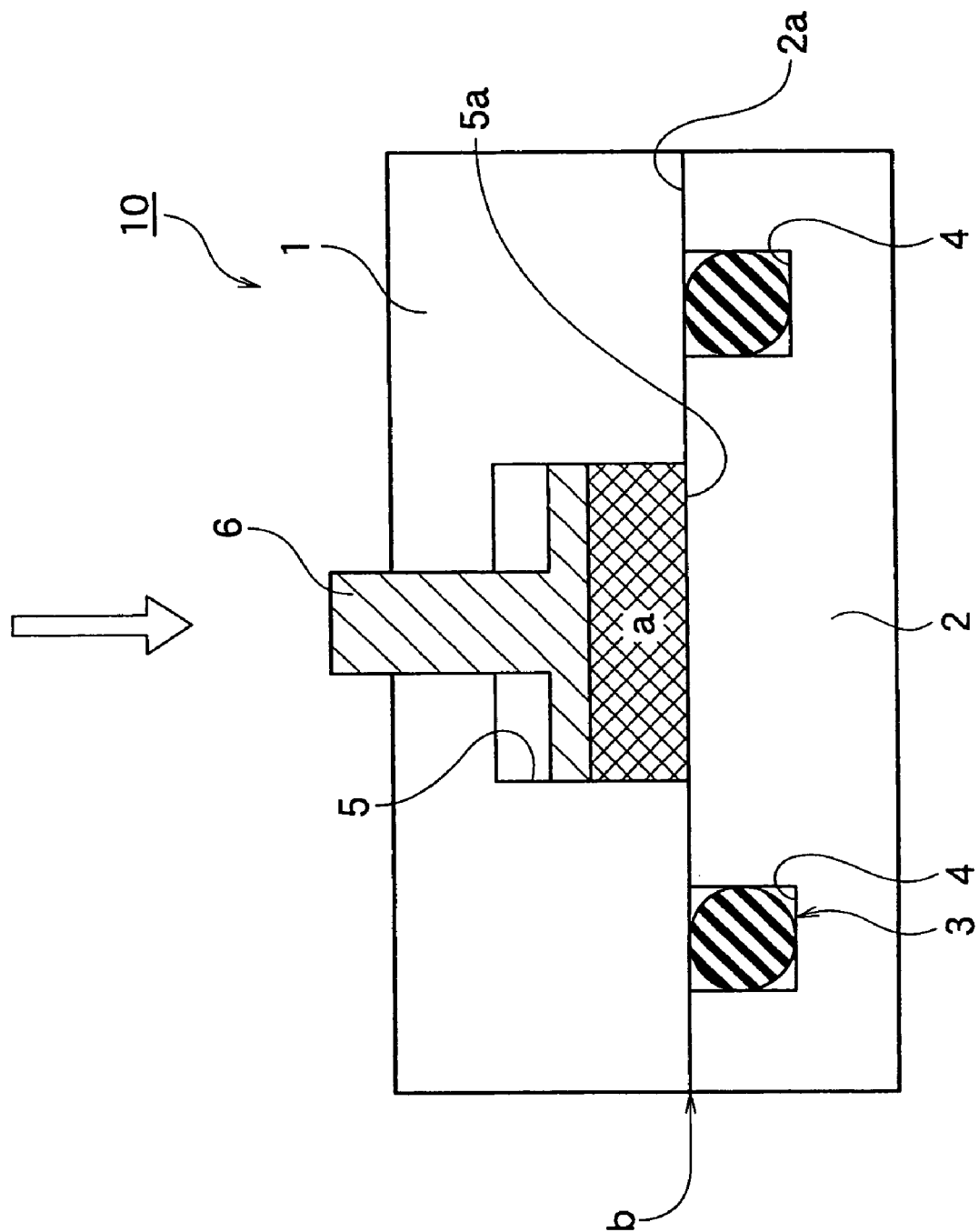
FIG. 2 is an illustrative diagram showing a method of testing for a fuel sealant used in the present invention.

FIG. 2 is a cross sectional schematic view of a jig used in the low temperature sealing test. This jig 10 for the low temperature test is composed of a lower jig 2 and an upper jig 1 set on the upper surface of the lower jig. On the upper surface 2a of the lower jig 2, planar ring-like grooves 4 are provided and in each groove a P-24 O-ring 3 is set in. In the upper jig 1, a hole 5 penetrated up and down is provided. In the lower part 5a inside the hole 5, a fluorine inert liquid a (Trade Name "Fluorinert (R)" manufactured by US 3M Company) is introduced and the lower surface of the liquid a is contacted and sealed with the upper surface 2a of the lower jig 2. The upper part of the liquid a, a press 6 capable of pressurizing the liquid a is provided.

In the subsequent steps of the low temperature sealing test, after the fluorine inert liquid ("Fluorinert FC77" (R) manufactured by US 3M Company) is introduced into the part a of the jig for the low temperature sealing test as shown in FIG. 2, the jig is allowed to stand in a constant temperature bath at −40° C. for 1 hr.

Thereafter, a pressure of 1 MPa is applied by pushing the press 6 down as shown with an arrow (→) in FIG. 2 and then leakage of the fluorine inert liquid from the contact surface b between the lower jig 2 and the upper jig 1 is observed.

Fuel Sealing Test

The fuel sealing test is also carried out using the jig as shown in FIG. 2.

That is, in the fuel sealing test, methanol is introduced into the part a of the jig as shown in FIG. 2 in place of the fluorine inert liquid ("Fluorinert FC77" (R) manufactured by US 3M Company) and then is allowed to stand at 25° C. for 168 hr. Thereafter, methanol is removed and the fluorine inert liquid "Fluorinert FC77" is introduced and then the press 6 is pressed down as shown by the arrow (→) in FIG. 2 and thereby 1 MPa pressure is applied. Leakage of the fluorine inert liquid "Fluorinert FC77" from the contact surface b between the lower jig 2 and the upper jig 1 is observed.

(i-1) <FKM(A1)>:

A fluorine containing copolymer (uncross-linked fluororubber) having a Moony viscosity (defined in accordance with JIS K 6300, $ML_{1+10}$, 121° C.) of 100 and comprising;

(a1) 22% by mol of perfluoromethyl vinylether component unit, (b1) 61% by mol of vinylidene fluoride component unit, (c1) 17% by mol of tetrafluoroethylene component unit, (d1) 0% by weight of hexafluoropropylene component unit, provided that the total of the component units (a1) to (d1) is 100% by mol, and a small amount of a bromide and iodide unsaturated fluorohydrocarbon component unit for the crosslinking site based on 100% by mol of the total of the component units (a1) to (d1).

(i-2) <FKM(A2)>:

A fluorine containing copolymer (uncross-linked fluororubber) having a Moony viscosity (defined in accordance with JIS K 6300, $ML_{1+10}$, 121° C.) of 50 and comprising;

(a1) 17% by mol of perfluoromethyl vinylether component unit, (b1) 74% by mol of vinylidene fluoride component unit, (c1) 9% by mol of tetrafluoroethylene component unit, (d1) 0% by weight of hexafluoropropylene component unit, provided that the total of the component units (a1) to (d1) is 100% by mol, and a small amount of a bromide and iodide unsaturated fluorohydrocarbon component unit for the crosslinking site based on 100% by mol of the total of the component units (a1) to (d1)

(i-3) <FKM(A3)>:

A fluorine containing copolymer (uncross-linked fluororubber) having a Moony viscosity (defined in accordance with JIS K 6300, $ML_{1+10}$, 121° C.) of 50 and comprising;

(a1) 24% by mol of perfluoromethyl vinylether component unit, (b1) 59% by mol of vinylidene fluoride component unit, (c1) 17% by mol of tetrafluoroethylene component unit, (d1) 0% by weight of hexafluoropropylene component unit provided that the total of the component units (a1) to (d1) is 100% by mol, and a small amount of a bromide and iodide unsaturated fluorohydrocarbon component unit for the crosslinking site based on 100% by mol of the total of the component units (a1) to (d1).

(ii) <N990 Carbon>

Thermax N990 manufactured by Cancarb.

(iii) <Bituminous Fine Powder>

Average particle diameter 6 μm, manufactured by Keystone Filler & Mfg, Mineral Black 325BA Example 1

<Composition of Blend>

| | |
|---|---|
| FKM (A1) | 100 parts by weight |
| N990 carbon | 10 parts by weight |
| Bituminous fine powder | 30 parts by weight |
| Calcium hydroxide (as an acid-receiving agent) | 5 parts by weight |
| 2,5-dimethyl-2,5-di (tertiary butylperoxy) hexane | 2 parts by weight |
| Triallylisocyanurate | 5 parts by weight |

The blend having the above composition was kneaded by means of a kneader and an open roll to prepare an unvulcanized rubber composition. The vulcanization molding of the unvulcanized rubber composition was carried out by primary vulcanization at 170° C. for 20 min using a vulcanization press and secondary vulcanization at 160° C. for 2 hr using a heating oven to prepare a vulcanized sheet having a size of 150 mm×150 mm×2 mm (thickness) and an O-ring having a P-24 size.

With regard to the resulting vulcanized sheet, the ordinary physical properties were measured in accordance with JIS K 6253 and JIS K 6251, the TR test was carried out in accordance with JIS K 6261 and the change in volume after immersing the sheet in each of a fuel oil C and methanol at 25° C. for 168 hr was measured in accordance with JIS K 6258. With regard to the O-ring, the permanent compression set after it was allowed to stand at 200° C. for each of 70 hr and for 500 hr was measured in accordance with JIS K 6262.

Furthermore, the low temperature sealing test and the fuel-sealing test were carried out by the above-described methods. The results are shown in Table 1.

Example 2

The procedure of Example 1 was repeated except that N990 carbon was used in an amount of 30 parts by weight and bituminous fine powder was used in an amount of 10 parts by weight to prepare a vulcanized sheet and an O-ring having a P-24 size.

The resulting vulcanized sheet and the O-ring were subjected to the tests in the same manner as in Example 1.

The results are shown in Table 1.

Comparative Example 1

The procedure of Example 1 was repeated except that FKM (A1) was changed to FKM (A2), that is, the fluorine containing copolymer which comprises 74% by mol of the vinylidene fluoride component unit, 9% by mol of the tetrafluoroethylene component unit, 17% by mol of the perfluoromethyl vinylether component unit (the total of these component units being 100% by mol), and a small amount of the bromide and iodide unsaturated fluorohydrocarbon component unit for the crosslinking site based on the total of the above component units to prepare a vulcanized sheet and an O-ring having a P-24 size.

The resulting vulcanized sheet and the O-ring were subjected to the tests in the same manner as in Example 1.
The results are shown in Table 1.

Comparative Example 2

The procedure of Example 1 was repeated except that FKM (A1) was changed to FKM (A3), that is, the fluorine containing copolymer which comprises 59% by mol of the vinylidene fluoride component unit, 17% by mol of the tetrafluoroethylene component unit, 24% by mol of the perfluoromethyl vinylether component unit (the total of these component units being 100% by mol), and a small amount of a bromide and iodide unsaturated fluorohydrocarbon component unit for the crosslinking site based on the total of the above component units, to prepare a vulcanized sheet and an O-ring having a P-24 size.
The resulting vulcanized sheet and the O-ring were subjected to the tests in the same manner as in Example 1.
The results are shown in Table 1.

Comparative Example 3

The procedure of Example 1 was repeated except that N990 carbon was used in an amount of 39 parts by weight and bituminous fine powder was used in an amount of 1 part by weight to prepare a vulcanized sheet and an O-ring having a P-24 size.
The resulting vulcanized sheet and the O-ring were subjected to the tests in the same manner as in Example 1.
The results are shown in Table 1.

Comparative Example 4

The procedure of Example 1 was repeated except that N990 carbon was used in an amount of 1 part by weight and bituminous fine powder was used in an amount of 55 parts by weight, but the blend had a too high viscosity so that it could not be kneaded.

Comparative Example 5

The procedure of Example 1 was repeated except that 2,5-dimethyl-2,5-di-(tertiary butylperoxy)hexane was used in an amount of 0.3 part by weight, but in the molding, the crosslinking density was not increased.

Comparative Example 6

The procedure of Example 1 was repeated except that 2,5-dimethyl-2,5-di-(tertiary butylperoxy)hexane was used in an amount of 8 parts by weight, but in the vulcanization, the blend was foamed and thereby a normal specimen was not prepared.

Comparative Example 7

The procedure of Example 1 was repeated except that triallyl isocyanurate was used in an amount of 0.5 part by weight, but in the molding, the crosslinking density was not increased and thereby a normal specimen was not prepared.

Comparative Example 8

The procedure of Example 1 was repeated except that triallyl isocyanurate was used in an amount of 12 parts by weight to prepare a vulcanized sheet and an O-ring having a P-24 size.

The resulting vulcanized sheet and the O-ring were subjected to the tests in the same manner as in Example 1. In the freeze resistance test, it was necessary to extend and draw a specimen 50% and submit to the test, but the measurement could not be carried out because the resulting specimen had a breaking extension of 30% The results are shown in Table 1.

TABLE 1

| | Example | | Comparative Example | | | |
|---|---|---|---|---|---|---|
| | 1 | 2 | 1 | 2 | 3 | 8 |
| Ordinary physical properties | | | | | | |
| Hardness (Durometer A) | 80 | 79 | 80 | 80 | 83 | 95 |
| Tensile strength (MPa) | 10.4 | 14.9 | 16.9 | 16.3 | 14.8 | 10.6 |
| Elongation (%) | 230 | 220 | 230 | 230 | 200 | 30 |
| Freeze resistance TR-10 value (° C.) | −27 | −27 | −30 | −24 | −27 | Unmeasurable |
| Fuel oil resistance Fuel oil C, 25° C. × 168 hr Change in Volume (%) | +5 | +5 | +7 | +6 | +4 | — |
| Fuel oil resistance Methanol, 25° C. × 168 hr Change in Volume (%) | +11 | +12 | +70 | +10 | +12 | — |
| Permanent compression set 200° C. × 70 hr | 20 | 25 | 37 | 43 | 38 | — |
| Permanent compression set (%) 200° C. × 500 hr | 57 | 72 | 95 | 99 | 96 | — |
| Permanent compression set (%) | | | | | | |
| Low temperature sealing test | No leakage | No leakage | No leakage | Leakage | No leakage | |
| Fuel sealing test | No leakage | No leakage | Leakage | No leakage | No leakage | |

As is clear from Table 1, the resulting vulcanized sheet and the O-ring prepared in each of Example 1 and Example 2, can be suitably used as a sealant for automobile fuel because of having excellent heat resistance, freeze resistance and fuel oil resistance. As the resulting vulcanized sheet and the O-ring prepared in Comparative example 1 had inferior fuel oil resistance, in the fuel sealing test, the fuel was leaked out due to the O-ring protruding out caused by swelling, thereby to induce leakage of the fuel. As the resulting vulcanized sheet and the O-ring prepared in Comparative Example 2 had inferior freeze resistance, in the low temperature sealing test, leakage of the fluorine inert liquid was occurred. In Comparative Example 3, the resulting vulcanized sheet and the O-ring had insufficient heat resistance, and in Comparative Example 6, they scarcely had rubber elasticity, and thereby they could not be used as a sealant. In the table, the blank columns (−) show that the tests were not carried out because the specimen scarcely had rubber elasticity and could not be used as a sealant.

The invention claimed is:

1. A fluororubber sealant composition comprising:
   100 parts by weight of a fluororubber, which is a copolymer having a crosslinking site derived from a bromine-containing and/or iodine-containing compound, capable of crosslinking with peroxide and having a component unit composition comprising;
   (a) 20.5 to 22.5% by mol of a perfluoromethyl vinylether component unit,
   (b) 60 to 70% by mol of a vinylidene fluoride component unit,
   (c) 10 to 20% by mol of a tetrafluoroethylene component unit,
   (d) 0 to 10% by mol of hexafluoropropylene component unit (based on 100% by mol of the total of the component units (a) to (d)), and
   (e) a small amount of a bromide and/or iodide unsaturated fluorohydrocarbon component unit as a crosslinking site based on 100% by mol of the total of the component units (a) to (d); and, based on 100 parts by weight of the fluororubber,
   2 to 50 parts by weight of a bituminous fine powder;
   0.5 to 6 parts by weight of an organoperoxide; and
   1 to 10 parts by weight of a polyfunctional monomer.

2. The fluororubber sealant composition according to claim 1, which is used in forming sealants for any one of products of oils such as fuel oil, lubricating oil and hydraulic oil; aromatic hydrocarbons; aliphatic hydrocarbons; and alcohols.

3. The fluororubber sealant composition according to claim 1, which is used in forming a fluororubber sealant for automobile fuel.

4. A fluororubber sealant obtainable by crosslinking a fluororubber sealant composition as claimed in claim 1.

5. The fluororubber sealant according to claim 4, which is used for any one of products of oils such as fuel oil, lubricating oil and hydraulic oil; aromatic hydrocarbons; aliphatic hydrocarbons; and alcohols.

6. The fluororubber sealant according to claim 4, which is used as a fluororubber sealant for automobile fuel.

7. The fluororubber sealant for automobile fuel according to claim 4 which has a TR 10 value, determined by a TR test as defined in JIS K 6261, of not higher than −26° C., and a swelling index with methanol at 250° C. for 168 hr as defined in JIS K 6258 of not more than +30%.

8. A fluororubber sealant obtainable by crosslinking a fluororubber sealant composition as claimed in claim 2.

9. A fluororubber sealant obtainable by crosslinking a fluororubber sealant composition as claimed in claim 3.

10. The fluororubber sealant for automobile fuel according to claim 5 which has a TR 10 value, determined by a TR test as defined in JIS K 6261, of not higher than −26° C., and a swelling index with methanol at 25° C. for 168 hr as defined in JIS K 6258 of not more than +30%.

11. The fluororubber sealant for automobile fuel according to claim 6 which has a TR 10 value, determined by a TR test as defined in JIS K 6261, of not higher than −26° C., and a swelling index with methanol at 25° C. for 168 hr as defined in JIS K 6258 of not more than +30%.

* * * * *